US012679732B2

(12) United States Patent
Zheng et al.

(10) Patent No.: US 12,679,732 B2
(45) Date of Patent: Jul. 14, 2026

(54) TWO-DIMENSIONAL POLYMERIC FULLERENE AND PREPARATION METHOD THEREOF

(71) Applicant: Institute of Chemistry, Chinese Academy of Sciences, Beijing (CN)

(72) Inventors: Jian Zheng, Beijing (CN); Xueping Cui, Beijing (CN); Lingxiang Hou, Beijing (CN); Lingxin Luo, Beijing (CN)

(73) Assignee: INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 584 days.

(21) Appl. No.: 18/318,418

(22) Filed: May 16, 2023

(65) Prior Publication Data

US 2023/0373790 A1 Nov. 23, 2023

(51) Int. Cl.
*C01B 32/154* (2017.01)
*C01B 32/156* (2017.01)

(52) U.S. Cl.
CPC .......... *C01B 32/154* (2017.08); *C01B 32/156* (2017.08); *C01P 2002/76* (2013.01)

(58) Field of Classification Search
CPC ... C01B 32/154; C01B 32/156; C01P 2002/76
See application file for complete search history.

(56) References Cited

U.S. PATENT DOCUMENTS

| | | | | |
|---|---|---|---|---|
| 7,122,710 B2 * | 10/2006 | Margrave | B82Y 40/00 570/129 |
| 2012/0205587 A1 * | 8/2012 | Choi | C01B 32/152 977/734 |
| 2022/0024766 A1 * | 1/2022 | Parker | D04H 1/4242 |

FOREIGN PATENT DOCUMENTS

| | | |
|---|---|---|
| CN | 1117092 A | 2/1996 |
| CN | 1621342 A | 6/2005 |
| JP | 11-157819 A | 6/1999 |
| JP | 2001-199715 A | 7/2001 |
| JP | 2001-210829 A | 8/2001 |
| JP | 2012-126634 A | 7/2012 |

OTHER PUBLICATIONS

Davidov et al., 'Spectroscopic Study of Pressure-Polymerized phases of C60' in Phys. Rev. B vol. 61pp. 11936-11945. (Year: 2000).*

* cited by examiner

*Primary Examiner* — Stuart L Hendrickson
(74) *Attorney, Agent, or Firm* — Calfee, Halter & Griswold LLP

(57) ABSTRACT

The present disclosure relates to a two-dimensional polymeric fullerene and preparation method thereof, wherein the preparation method includes the following steps: providing metal intercalated polymeric fullerene; replacing metal ions in the metal intercalated polymeric fullerene with quaternary ammonium salts. The preparation method of the two-dimensional polymeric fullerene of an embodiment of the present application has simple process and low cost, which can achieve large-scale preparation of two-dimensional polymeric fullerene.

11 Claims, 8 Drawing Sheets

TWO-DIMENSIONAL POLYMERIC FULLERENE AND PREPARATION METHOD THEREOF

CROSS-REFERENCE TO RELATED APPLICATIONS

This application claims priority to Chinese Patent Application No. 202210542519.7, filed on May 18, 2022, which is hereby incorporated by reference in their entirety.

TECHNICAL FIELD

The present application relates to two-dimensional polymeric fullerene and especially to a thin layered two-dimensional polymeric fullerene and preparation method thereof.

BACKGROUND ART

Two-dimensional materials have attracted widespread attention owing to their unique electronic and optical properties generated by quantum confinement effects in their monolayers. Among them, two-dimensional carbon materials with unique π-electron systems are one of the main research objects. By changing the hybridization mode of carbon atoms, two-dimensional carbon materials can exhibit rich physical properties and have broad application prospects in transistor devices, energy storage materials, and superconducting materials.

So far, the reports on two-dimensional materials are limited to the periodic network structure interwoven by single atomic structural units, while the use of advanced structural units (such as clusters) to build two-dimensional structures is a new concept. These two-dimensional structures constructed by nanocluster structural units are expected to have superior topologies and distinct properties. Fullerenes (e.g. $C_{60}$) are typical carbon clusters. Under extremely high pressure, the polymerization of fullerene occurs by forming intercluster covalent bonds to produce a layered structure. Such a polymeric fullerene layer presents a regular topological structure of carbon clusters arranged repeatedly on the plane, which has interesting electronic and magnetic properties. However, due to the metastable nature at room temperature and pressure of the bulk polymeric fullerene prepared under extremely high pressure, conventional mechanical exfoliation methods have not been able to successfully prepare two-dimensional polymeric fullerene.

SUMMARY OF THE INVENTION

In view of the above analysis, an embodiment of the present disclosure aims to provide a preparation method of two-dimensional polymeric fullerene to solve at least one of the problems existing in the aforementioned prior art.

In a first aspect, an embodiment of the present application provides a two-dimensional polymeric fullerene. In the polymeric fullerene, adjacent fullerene molecules are connected with each other through covalent bond, showing a regular topological structure of repeated arrangement.

According to an embodiment of the present application, in the cell of the crystal structure of the two-dimensional polymeric fullerene, there are 8 fullerene clusters arranged around each central fullerene cluster, wherein 8 fullerene clusters are arranged in a cuboid shape, and each fullerene cluster is located at a vertex of the cuboid.

According to an embodiment of the present application, each fullerene cluster is connected with four fullerene clusters, and is connected with two of the fullerene clusters through one C—C single bond respectively, while is connected with the other two of the fullerene clusters through two C—C single bonds respectively, and the four carbon atoms in the two C—C single bonds form a quaternary ring structure.

According to an embodiment of the present application, the two-dimensional polymeric fullerene has a thin layer structure with a thickness less than 100 nm.

According to an embodiment of the present application, the two-dimensional polymeric fullerene has a thin layer structure with a thickness less than 5 nm.

According to an embodiment of the present application, the two-dimensional polymeric fullerene has a thickness of 0.5-3 nm.

According to an embodiment of the present application, the two-dimensional polymeric fullerene has stable chemical properties and will not decompose under ambient pressure.

According to an embodiment of the present application, the two-dimensional polymeric fullerene is two-dimensional polymeric $C_{60}$.

In a second aspect, an embodiment of the present application provides a preparation method for the two-dimensional polymeric fullerene, including the following steps:

providing metal intercalated polymeric fullerene; and replacing metal ions in the metal intercalated polymeric fullerene with quaternary ammonium salts.

In the metal intercalated polymeric fullerene, the metal is magnesium, lithium, potassium, or sodium.

According to an embodiment of the present application, the metal intercalated polymeric fullerene has a monoclinic crystal structure, and the cell parameters of the crystal structure are: a=9.31 Å, b=9.03 Å, c=14.78 Å, α=90°, β=91.70°, γ=90°.

According to an embodiment of the present application, the metal intercalated polymeric fullerene is magnesium intercalated polymeric fullerene, lithium intercalated polymeric fullerene, sodium intercalated polymeric fullerene or potassium intercalated polymeric fullerene.

According to an embodiment of the present application, the structural formula of the quaternary ammonium salts is as follows:

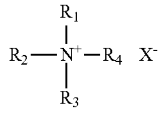

wherein $R_1$, $R_2$, $R_3$ and $R_4$ are independently selected from alkyl groups containing 1-8 carbon atoms, with $X^-$ being salicylate ions, fluoride ions, bromine ions, or 8-hydroxyquinoline anions or other anions with coordination ability with metal ions, such as magnesium ions, lithium ions, potassium ions, or sodium ions.

According to an embodiment of the present application, $R_1$, $R_2$, $R_3$ and $R_4$ are independently selected from alkyl groups containing 2-4 carbon atoms or alkyl groups containing 7-8 carbon atoms.

According to an embodiment of the present application, the quaternary ammonium salts can be one or more of tetrabutylsalicylic acid ammonium, tetrabutylammonium fluoride, tetrabutylammonium bromide, or 8-hydroxyquinoline tetrabutylamine salts.

According to an embodiment of the present application, the method includes: mixing metal intercalated polymeric fullerene with a quaternary ammonium salt solution, and standing for 1 day-1 month.

According to an embodiment of the present application, solvents of the quaternary ammonium salt solution are aprotic solvents.

According to an embodiment of the present application, the solvents of the quaternary ammonium salt solution include one or more of N-methylpyrrolidone (NMP), N,N-dimethylformamide (DMF), or acetonitrile.

According to an embodiment of the present application, the metal intercalated polymeric fullerene can be prepared by the following method: reacting fullerene with metal to obtain metal intercalated polymeric fullerene; wherein, the molar ratio of the fullerene to the metal is 1:8 to 1:12.

According to an embodiment of the present application, the reaction temperature of the fullerene and the metal is 580° C. to 600° C., and the metal is magnesium, lithium, potassium, or sodium.

In a third aspect, an embodiment of the present application provides a polymeric fullerene crystal, wherein adjacent fullerene molecules are connected by covalent bonds, showing a regular topological structure of repeated cluster arrangement, without metal intercalated.

According to an embodiment of the present application, the two-dimensional polymeric fullerene has stable chemical properties and will not decompose under ambient pressure.

According to an embodiment of the present application, the polymeric fullerene has a monoclinic crystal structure, and the unit cell is quasi-tetragonal.

In a fourth aspect, an embodiment of the present application provides applications of aforementioned two-dimensional polymeric fullerene in electronic devices (e. g. superconducting devices, field effect transistors), catalysis, or energy storage fields.

Compared with the prior art, the present application can achieve at least one of the following beneficial effects:

1. The preparation method of two-dimensional polymeric fullerene of an embodiment of the present application has the advantages of simple process and low cost, and can achieve large-scale preparation of two-dimensional polymeric fullerene.
2. The two-dimensional polymeric fullerene of an embodiment of the present application has the characteristics of large size and high crystallinity.

In the present application, the above technical schemes can also be combined with each other to realize more preferred combination schemes. Other features and advantages of the present application will be described in the following instructions, and some advantages may become apparent from the instructions or be understood by implementing the present application. The object and other advantages of the present application can be realized and obtained through the contents specially pointed out in the instructions and the accompanying drawings.

BRIEF DESCRIPTION OF DRAWINGS

The drawings are only to show specific embodiments and are not considered as a limitation of the present application. Wherein.

DETAILED DESCRIPTION OF THE INVENTION

The preferred embodiments of the present application are described in detail below in combination with the accompanying drawings. The accompanying drawings form part of the application and, together with the embodiments of the present application, are used to explain the principle of the present application, not to limit the scope of the present application.

An embodiment of the present application provides a preparation method of a two-dimensional polymeric fullerene, including the following steps:

S1: providing metal intercalated polymeric fullerene; and

S2: replacing metal ions in the metal intercalated polymeric fullerene with quaternary ammonium salts;

wherein, the metal intercalated polymeric fullerene has a monoclinic crystal structure.

The preparation method of the two-dimensional polymeric fullerene according to an embodiment of the present application involves using quaternary ammonium salts to coordinate with bulk metal intercalated polymeric fullerene, replacing metal ions intercalated in the polymeric fullerene, and exfoliating the bulk materials into two-dimensional materials to obtain exfoliated thin layered two-dimensional polymeric fullerene.

Figure 2:
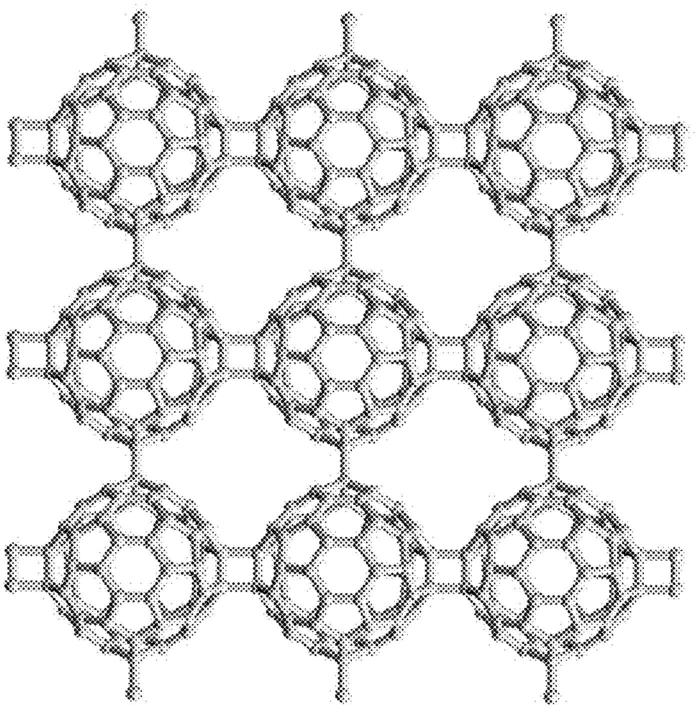
FIG. 2 is a schematic diagrams of a single crystal structure of the bulk magnesium intercalated polymeric fullerene prepared in Embodiment 1 of the present application.

In one embodiment, the metal intercalated polymeric fullerene has a monoclinic crystal structure, and its cell can be a quasi-tetragonal structure as shown in FIG. 2, that is, there are 8 fullerene clusters arranged around each central fullerene cluster, 8 fullerene clusters are arranged in a cuboid shape, and each fullerene cluster is located at a vertex of the cuboid.

In one embodiment, the cell parameters of the metal intercalated polymeric fullerene crystal are: a=9.31 Å, b=9.03 Å, c=14.78 Å, $\alpha$=90°, $\beta$=91.70°, $\gamma$=90°.

In one embodiment, the thickness of the metal intercalated polymeric fullerene is greater than or equal to 10 microns, further ranging from 10 to 1000 microns, and further ranging from 50 to 900 microns, such as 60 microns, 70 microns, 80 microns, 90 microns, 100 microns, 200 microns, 300 microns, 400 microns, 500 microns, 600 microns, 700 microns, and 800 microns.

The preparation method of the two-dimensional polymeric fullerene according to an embodiment of the present application first involves doping fullerene with metal to polymerize fullerene monomers (doping polymerization), resulting in block shaped metal intercalated polymeric fullerene; Then, use quaternary ammonium salts to coordinate with the polymeric fullerene, replacing metal ions intercalated in the polymeric fullerene, and exfoliating the bulk materials into two-dimensional materials to obtain thin layered two-dimensional polymeric fullerene.

In one embodiment, the metal used for doping can be magnesium or lithium or potassium or sodium, to obtain magnesium intercalated polymeric fullerene or lithium intercalated polymeric fullerene or potassium intercalated polymeric fullerene or sodium intercalated polymeric fullerene.

In one embodiment, in step S1, the molar ratio of fullerene to magnesium used can be 1:8-1:12, further ranging from 1:9-1:12, such as 1:8.5, 1:8.9, 1:9.5, 1:10, 1:10.4, 1:10.5, 1:11, 1:11.5.

In one embodiment, in step S1, a reaction temperature of magnesium and fullerene can be between 580-600° C., such as 585° C., 590° C., 595° C.; a reaction time can be 20-24 hours, such as 21 hours, 22 hours, and 23 hours.

In one embodiment, in step S2, the mass ratio of quaternary ammonium salt to metal intercalated polymeric fullerene is 5:1 to 20:1, such as 6:1, 8:1, 10:1, 12:1, 15:1, 16:1, 18:1.

In one embodiment, the structural formula of the quaternary ammonium salt is as follows:

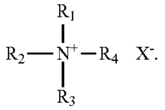

$R_1$, $R_2$, $R_3$ and $R_4$ are independently selected from alkyl groups containing 2-8 carbon atoms, with $X^-$ being salicylate ions, fluoride ions, bromine ions, or 8-hydroxyquinoline anions.

In one embodiment, the number of carbon atoms contained in $R_1$, $R_2$, $R_3$ and $R_4$ can be 3, 4, 5, 6, or 7.

In one embodiment, $R_1$, $R_2$, $R_3$ and $R_4$ are independently selected from linear alkyl groups containing 2-8 carbon atoms.

In one embodiment, $R_1$, $R_2$, $R_3$ and $R_4$ are independently selected from alkyl groups containing 2-4 carbon atoms or alkyl groups containing 7-8 carbon atoms; Furthermore, $R_1$, $R_2$, $R_3$ and $R_4$ are independently selected from linear alkyl groups containing 2-4 carbon atoms or 7-8 carbon atoms.

In one embodiment, $R_1$, $R_2$, $R_3$ and $R_4$ are the same functional groups, such as n-butyl.

In one embodiment, the quaternary ammonium salts can be one or more of tetrabutylsalicylic acid ammonium, tetrabutylammonium fluoride, tetrabutylammonium bromide, or 8-hydroxyquinoline tetrabutylamine salts.

In one embodiment, step S2 includes: mixing metal intercalated polymeric fullerene with a quaternary ammonium salt solution, and standing at a temperature of 20-30° C. (such as 22° C., 24° C., 25° C., 26° C., 28° C.) for 1 day-1 month (such as 3 days, 10 days, 20 days).

In one embodiment, solvents of the quaternary ammonium salt solution can be aprotic solvents, such as N-methylpyrrolidone (NMP), N,N-dimethylformamide (DMF), or acetonitrile. Due to the relatively stable presence of the exfoliated two-dimensional polymeric fullerene in aprotic solvents, the solvents of the quaternary ammonium salt solution are preferably aprotic solvents, and further preferably N-methylpyrrolidone.

In one embodiment, step S2 includes: mixing a metal intercalated polymeric fullerene with a quaternary ammonium salt solution, and standing at a temperature of 20-30° C. for 1 day-1 month; Afterwards, shake the solution system and then centrifuge to remove the sediment; Wash the obtained dispersion and centrifuge to remove the supernatant to obtain a turbid solution containing two-dimensional polymeric fullerene.

In one embodiment, the two-dimensional polymeric fullerene has a thin layer structure of less than 100 nm, with a thickness of, for example, 50-100 nm.

In one embodiment, the two-dimensional polymeric fullerene has a thin layer structure of less than 5 nm, with a thickness of, for example, 2-3 nm.

An embodiment of the present application provides a two-dimensional polymeric fullerene which is prepared by the above method.

The two-dimensional polymeric fullerene of one embodiment of the present application has a larger lateral size, such as a length that can be greater than 20 microns; the larger lateral size enables the convenient application of two-dimensional polymeric fullerene in various fields, such as field-effect transistors.

The two-dimensional polymeric fullerene of one embodiment of the present application can stably exist in a dispersion system.

One implementation method of the present application utilizes metal intercalation to polymerize fullerene, resulting in a polymeric fullerene block material that can stably exist at room temperature and pressure; Furthermore, by exfoliating polymeric fullerene blocks with quaternary ammonium salt solution, the damage to the polymer structure is minimal and a good two-dimensional polymerization framework structure can be maintained.

The two-dimensional polymeric fullerene of one embodiment of the present application has stable chemical properties (or stable structure) and will not decompose under ambient pressure.

The preparation method of the two-dimensional polymeric fullerene according to an embodiment of the present application can obtain different types of two-dimensional polymeric fullerene by regulating the anions of quaternary ammonium salts.

The two-dimensional polymeric fullerene of one embodiment of the present application has advantages such as large size, thin thickness, high crystallinity, and structural stability, and has broad application prospects in fields such as electronics, catalysis, and energy storage.

The two-dimensional polymeric fullerene and preparation method thereof of one embodiment of the present application will further be explained below, in conjunction with the accompanying drawings and specific embodiments. Wherein, a quartz tube used has a diameter of 20 mm and a length of 400 mm.

Embodiment 1

Figure 1:
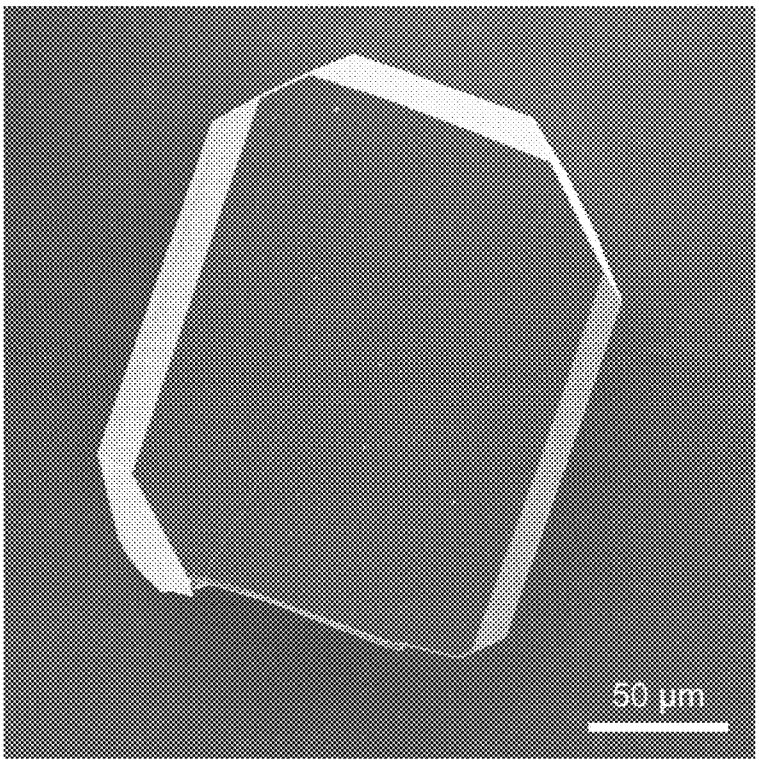
FIG. 1 is a scanning electron microscope image of the bulk magnesium intercalated polymeric fullerene crystal prepared in Embodiment 1 of the present application.
Figure 3:
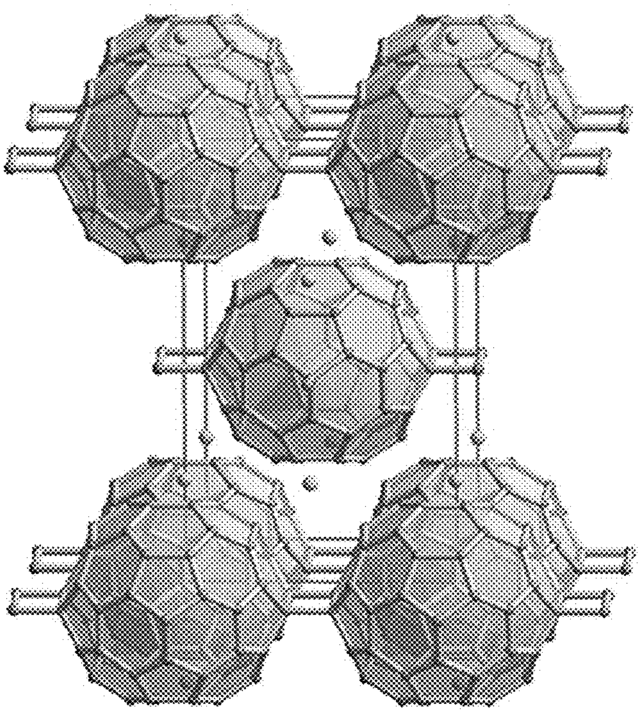
FIG. 3 is a schematic diagrams of a interlayer structure of the bulk magnesium intercalated polymeric fullerene prepared in Embodiment 1 of the present application.

S1: Add 500 mg of $C_{60}$ and 150 mg of magnesium powder (the molar ratio is 1:9) to a quartz tube in an argon glove box, and vacuum seal the quartz tube; Take the quartz tube out of the glove box and heat it in a dual temperature zone high-temperature reaction furnace for 24 hours. The sample reacts at 600° C. region and grows crystals at 500° C. region; Take out the heated quartz tube and remove the sample from the quartz tube in the argon glove box, obtaining magnesium intercalated polymeric $C_{60}$ blocks, as shown in FIG. 1; The magnesium intercalated polymeric $C_{60}$ crystal is then characterized by single crystal X-ray diffraction and its interlayer structure is obtained (FIG. 3). The cell parameters of the magnesium intercalated polymeric $C_{60}$ block are measured to be: a=9.31 Å, b=9.03 Å, c=14.78 Å, $\alpha$=90°, $\beta$=91.70°, $\gamma$=90°.

Figure 8:
FIG. 8 is a photograph of the two-dimensional polymeric fullerene dispersion prepared in Embodiment 1 of the present application.

S2: Dissolve 0.2 g of tetrabutylsalicylic acid ammonium in 20 mL of N-methylpyrrolidone to obtain a clear solution, and add 20 mg of the magnesium intercalated polymeric $C_{60}$ blocks to the N-methylpyrrolidone solution; Shake the solution system vigorously after left it to stand for 7 days and remove any precipitates in the system. Then centrifuge the resulting dispersion after wash it with 20 mL of N-methylpyrrolidone. After removing the supernatant, redisperse the sediment in NMP to obtain a dispersion of thin layered two-dimensional polymeric $C_{60}$ with size greater than 30 μm and thickness less than 5 nm. After placing the obtained dispersion at room temperature for 7 days, its photo is shown in FIG. 8. It can be seen that there is no obvious precipitation in the dispersion, indicating that the dispersion system can exist stably.

Figure 7:
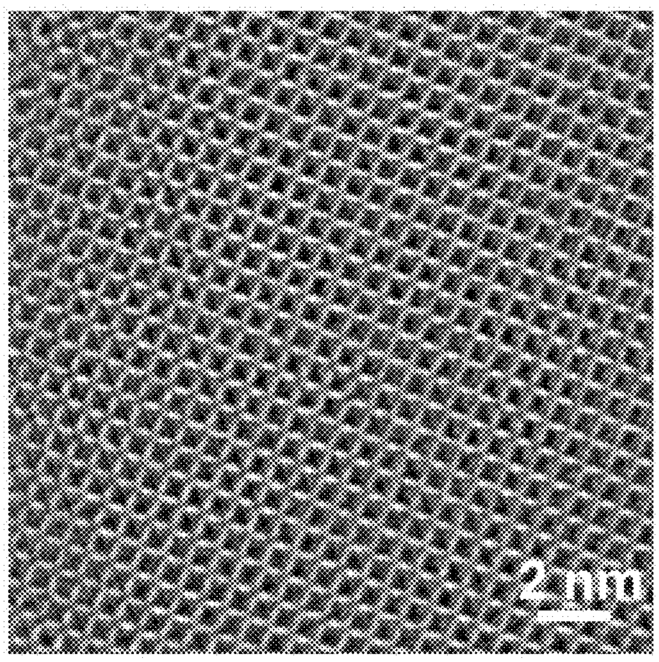
FIG. 7 is a scanning transmission electron microscope image of the two-dimensional polymeric fullerene prepared in Embodiment 1 of the present application.

By applying the aforementioned thin layer two-dimensional polymeric $C_{60}$ dispersion droplets onto a Si/$SiO_2$ substrate and allowing the solvent to evaporate, a thin layer of polymeric $C_{60}$ flake deposited on the surface of the substrate is obtained. Heating the thin layered polymeric $C_{60}$ at 600K for 10 minutes showed almost no change in its Raman spectra, proving the good thermal stability of the thin layered polymeric $C_{60}$. The two-dimensional polymeric $C_{60}$ is characterized by high-resolution scanning transmission electron microscopy, and the result is shown in FIG. 7. It can be seen that the fullerene layer still exhibits a regular topological structure of carbon clusters arranged repeatedly on the plane.

Embodiment 2

S1: Add 500 mg of $C_{60}$ and 44 mg of lithium strip into a quartz tube in an argon glove box, and vacuum seal the quartz tube; Take the quartz tube out of the glove box and heat it in a dual temperature zone high-temperature reaction furnace for 24 hours. The sample reacts at 600° C. region and grows crystals at 500° C. region; Take out the heated quartz tube and remove the sample from the quartz tube in the argon glove box, obtaining lithium intercalated polymeric $C_{60}$ blocks. Single crystal X-ray diffraction shows that their crystal cell structure is tetragonal.

Figure 11:
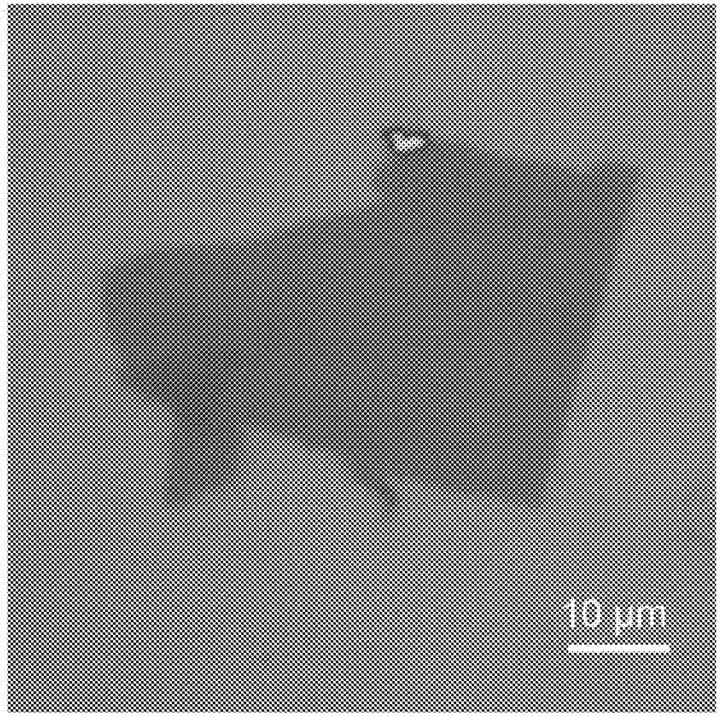
FIG. 11 is an optical microscope image of the two-dimensional polymeric fullerene prepared in Embodiment 2 of the present application.

S2: Dissolve 0.2 g of tetrabutylsalicylic acid ammonium in 20 mL of N-methylpyrrolidone to obtain a clear solution, and add 20 mg of the lithium intercalated polymeric $C_{60}$ blocks to the N-methylpyrrolidone solution; Shake the solution system vigorously after left it to stand for 7 days and remove any precipitates in the system. Then centrifuge the resulting dispersion after wash it with 20 mL of N-methylpyrrolidone. Remove the supernatant and then redisperse the sediment in NMP to obtain a dispersion of thin layered two-dimensional polymeric $C_{60}$ with size greater than 15 μm and thickness less than 5 nm. FIG. 11 is an optical microscope image of the obtained two-dimensional polymeric $C_{60}$ deposited on the substrate.

Embodiment 2-1

Figure 12:
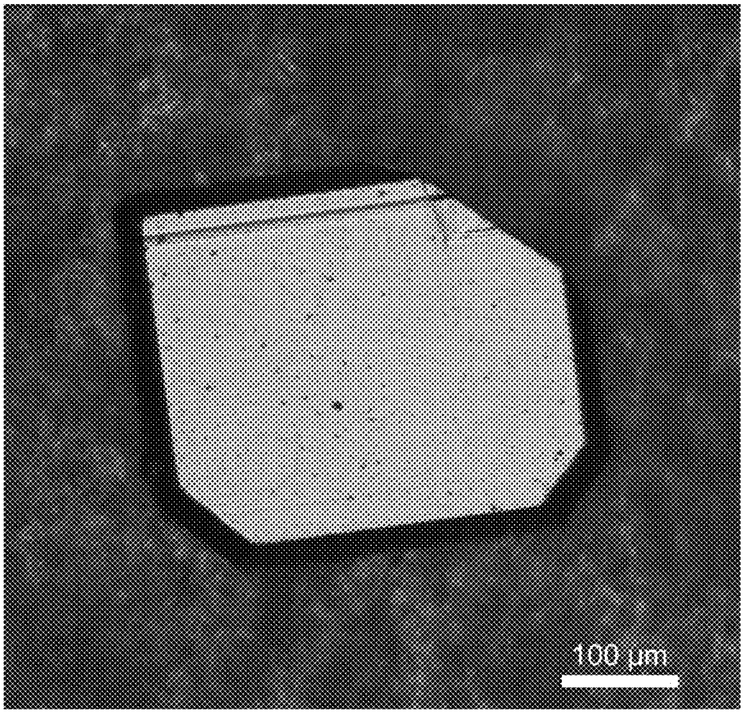
FIG. 12 is an optical microscope image of the bulk sodium intercalated polymeric fullerene prepared in Embodiment 2-1 of the present application.

This embodiment adopts the same steps as Embodiment 2 to prepare metal intercalated polymeric $C_{60}$ blocks and two-dimensional polymeric $C_{60}$ dispersion, with the only difference being that the metal used in Step S1 is sodium (156 mg). FIG. 12 is an optical microscope image of the prepared sodium intercalated polymeric $C_{60}$ block.

Embodiment 2-2

Figure 13:
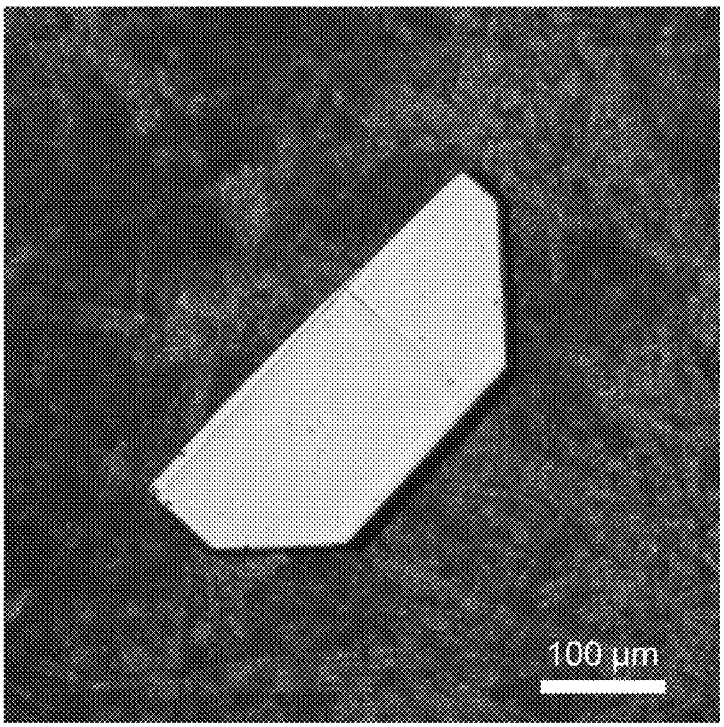
FIG. 13 is an optical microscope image of the bulk potassium intercalated polymeric fullerene prepared in Embodiment 2-2 of the present application.

This embodiment adopts the same steps as Embodiment 2 to prepare metal intercalated polymeric $C_{60}$ blocks and two-dimensional polymeric $C_{60}$ dispersion, with the only difference being that the metal used in Step S1 is potassium (244 mg). FIG. 13 is an optical microscope image of the prepared potassium intercalated polymeric $C_{60}$ block.

Embodiment 2-3

This embodiment adopts the same steps as Embodiment 2 to prepare two-dimensional polymeric $C_{60}$ dispersion, with the only difference being that the solution system of lithium intercalated polymeric $C_{60}$ in step S2 is left to stand for 1 day before subjected to subsequent treatment, ultimately obtaining a dispersion of thin layered two-dimensional polymeric $C_{60}$ with a thickness of 10-100 nm.

Embodiment 2-4

This embodiment adopts the same steps as Embodiment 2 to prepare two-dimensional polymeric $C_{60}$ dispersion, with the only difference being that the solution system of lithium intercalated polymeric $C_{60}$ in step S2 is left to stand for 3 days before subjected to subsequent treatment, ultimately obtaining a dispersion of thin layered two-dimensional polymeric $C_{60}$ with a thickness of 5-40 nm.

Embodiment 3

S1: Add 200 mg $C_{70}$ and 51 mg magnesium powder into a quartz tube in an argon glove box, and vacuum seal the quartz tube; Take the quartz tube out of the glove box and heat it in a dual temperature zone high-temperature reaction furnace for 2 days. The sample reacts at 600° C. region and grows crystals at 500° C. region; Take out the heated quartz tube and remove the sample from the tube in an argon glove box, obtaining quasi-tetragonal magnesium intercalated polymeric $C_{70}$ blocks.

S2: Dissolve 0.2 g of 8-hydroxyquinoline tetrabutylamine salt in 20 mL of N-methylpyrrolidone to obtain a clear solution, and add 20 mg of the magnesium intercalated polymeric $C_{70}$ blocks to the N-methylpyrrolidone solution; Shake the solution system vigorously after left it to stand for 5 days and remove any precipitates in the system. Then centrifuge the resulting dispersion after wash it with 20 mL of N-methylpyrrolidone. After removing the supernatant, a dispersion of thin layered two-dimensional polymeric fullerene is obtained with a thickness less than 5 nm.

Embodiment 3-1

This embodiment adopts the same steps as Embodiment 3 to prepare magnesium intercalated polymeric fullerene and two-dimensional polymeric fullerene dispersion, with the only difference being that the fullerene used in Step 51 is $C_{80}$ (230 mg).

Embodiment 3-2

This embodiment adopts the same steps as Embodiment 3 to prepare magnesium intercalated polymeric fullerene and two-dimensional polymeric fullerene dispersion, with the only difference being that the fullerene used in Step S1 is $C_{82}$ (234 mg).

Embodiment 3-3

This embodiment adopts the same steps as Embodiment 3 to prepare two-dimensional polymeric fullerene dispersion, with the only difference being that the solution system of magnesium intercalated polymeric fullerene in step S2 is left to stand for 10 days before subjected to subsequent treatment, ultimately obtaining a dispersion of thin layered two-dimensional polymeric fullerene with a thickness of 1-3 nm.

Embodiment 4

S1: Add 500 mg of $C_{60}$ and 175 mg of magnesium powder to a quartz tube in an argon glove box, and vacuum seal the quartz tube; Take the quartz tube out of the glove box and heat it in a dual temperature zone high-temperature reaction furnace for 20 hours. The sample reacts at 580° C. region and grows crystals at 500° C. region; Take out the heated quartz tube and remove the sample from the quartz tube in the argon glove box, obtaining quasi-tetragonal magnesium intercalated polymeric $C_{60}$ blocks.

Figure 14:
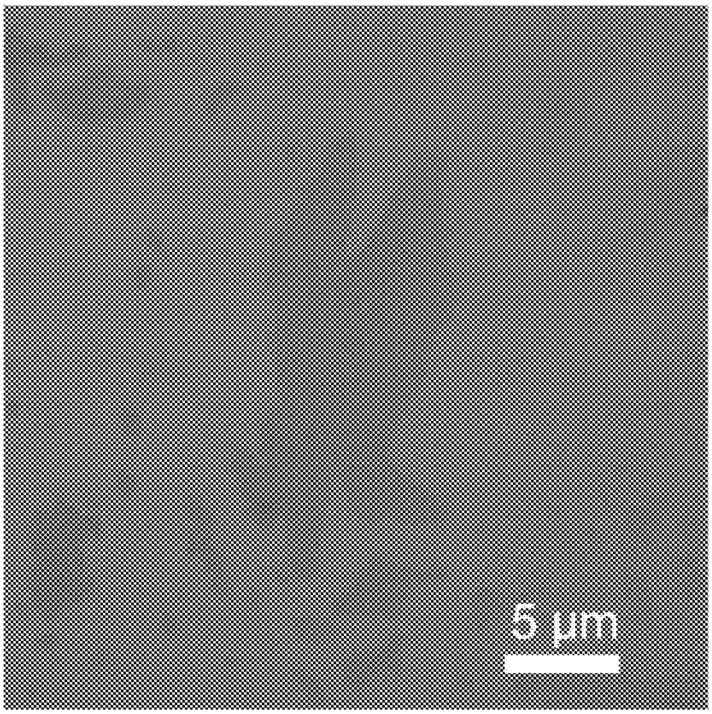
FIG. 14 is an optical microscope image of the two-dimensional polymeric fullerene prepared in Embodiment 4 of the present application.

S2: Dissolve 0.3 g of tetrabutylsalicylic acid ammonium in 20 mL of N-methylpyrrolidone to obtain a clear solution, and add 25 mg of the magnesium intercalated polymeric $C_{60}$ blocks to the N-methylpyrrolidone solution; Shake the solution system vigorously after left it to stand for 5 days and remove any precipitates in the system. Then centrifuge the resulting dispersion after wash it with 20 mL of N-methylpyrrolidone. After removing the supernatant, redisperse it in NMP to obtain a dispersion of thin layered two-dimensional polymeric $C_{60}$ with lateral size greater than 15 μm and thickness less than 5 nm. FIG. 14 is an optical microscope image of the two-dimensional polymeric $C_{60}$ deposited on the substrate.

Embodiment 4-1

This embodiment uses the same raw materials and steps as Embodiment 4 to prepare two-dimensional polymeric $C_{60}$ dispersion, with the only difference being that the quaternary ammonium salt used in Step S2 is tetrabutylammonium chloride. The prepared products are only small-sized thick layer blocks, and thin layer samples cannot be obtained.

Embodiment 4-2

Figure 15:
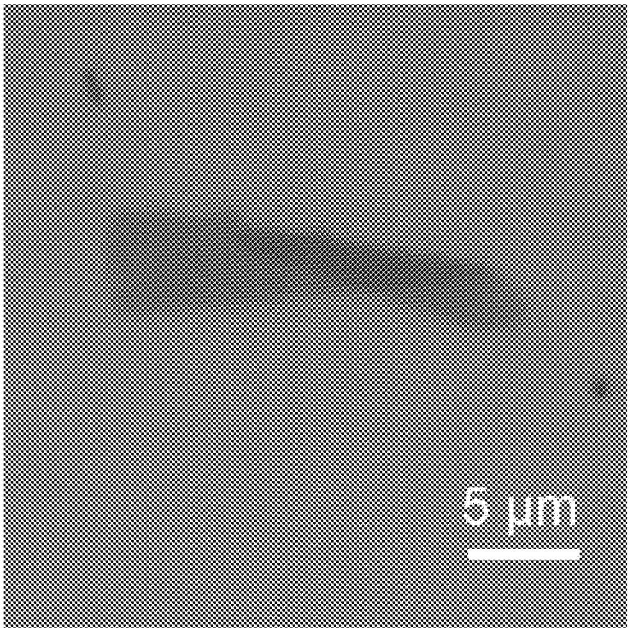
FIG. 15 is an optical microscope image of the two-dimensional polymeric fullerene prepared in Embodiment 4-2 of the present application.

This embodiment uses the same raw materials and steps as Embodiment 4 to prepare a two-dimensional polymeric $C_{60}$ dispersion, with the only difference being that the quaternary ammonium salt used in Step S2 is tetrabutylammonium bromide. As shown in FIG. 15, the prepared products are large-sized thin layer samples with a thickness of about 10 nm.

Embodiment 4-3

Figure 16:
FIG. 16 is a photo of the two-dimensional polymeric fullerene dispersion prepared in Embodiment 4-3 of the present application.

This embodiment uses the same raw materials and steps as Embodiment 4 to prepare two-dimensional polymeric $C_{60}$ dispersion, with the only difference being that the quaternary ammonium salt used in Step S2 is tetrabutylammonium fluoride, with a dosage of 0.5 g. The prepared NMP dispersion of two-dimensional polymeric $C_{60}$ with a thickness of 20-50 nm is shown in FIG. 16.

Embodiment 4-4

This embodiment uses the same raw materials and steps as Embodiment 4 to prepare two-dimensional polymeric $C_{60}$ dispersion, with the only difference being that the solution system of magnesium intercalated polymeric $C_{60}$ in step S2 is left to stand for 20 days before subjected to subsequent treatment, ultimately obtaining a dispersion of thin layered two-dimensional polymeric $C_{60}$ with a thickness of 1-3 nm.

Embodiment 5

S1: Add 500 mg of $C_{60}$ and 200 mg of magnesium powder to a quartz tube in an argon glove box, and vacuum seal the quartz tube; Take the quartz tube out of the glove box and heat it in a dual temperature zone high-temperature reaction furnace for 24 hours. The sample reacts at 600° C. region and grows crystals at 520° C. region; Take out the heated quartz tube and remove the sample from the quartz tube in the argon glove box, obtaining magnesium intercalated polymeric $C_{60}$ blocks.

S2: Dissolve 0.2 g of 8-hydroxyquinoline tetrabutylamine salt in 20 mL of acetonitrile to obtain a clear solution, and add 20 mg of the magnesium intercalated polymeric $C_{60}$ blocks to the acetonitrile solution; Shake the solution system vigorously after left it to stand for 5 days and remove any precipitates in the system. Then centrifuge the resulting dispersion after wash it with 20 mL of acetonitrile. After removing the supernatant, redisperse the sediment in acetonitrile to obtain a dispersion of a thin layered two-dimensional polymeric $C_{60}$ with lateral size greater than 5 μm and thickness less than 5 nm.

Embodiment 5-1

This embodiment uses the same raw materials and steps as Embodiment 5 to prepare two-dimensional polymeric $C_{60}$ dispersion, with the only difference being that the solution system of magnesium intercalated polymeric $C_{60}$ in step S2 is left to stand for 30 days before subjected to subsequent treatment, ultimately obtaining a dispersion of thin layered two-dimensional polymeric $C_{60}$ with a thickness of about 2 nm.

Embodiment 6

S1: Add 500 mg of $C_{60}$ and 150 mg of magnesium powder to a quartz tube in an argon glove box, and vacuum seal the quartz tube; Take the quartz tube out of the glove box and heat it in a dual temperature zone high-temperature reaction furnace for 24 hours. The sample reacts at 600° C. region and grows crystals at 500° C. region; Take out the heated quartz tube and remove the sample from the quartz tube in the argon glove box, obtaining magnesium intercalated polymeric $C_{60}$ blocks.

S2: Dissolve 20 mg of tetrabutylsalicylic acid ammonium in 20 mL of N-methylpyrrolidone to obtain a clear solution, and add 20 mg of the magnesium intercalated polymeric $C_{60}$ blocks to the N-methylpyrrolidone solution; Shake the solution system vigorously after left it to stand for 5 days; Centrifuge the above solution system to obtain precipitates and dispersion separately, wash and dry the precipitates to obtain polymeric $C_{60}$ crystals without metal intercalated. Then centrifuge the resulting dispersion after wash it with 20 mL of N-methylpyrrolidone. After removing the supernatant, redisperse the sediment in NMP to obtain a dispersion of thin layered two-dimensional polymeric $C_{60}$ with a thickness of 1-10 nm. The obtained polymeric $C_{60}$ crystal has a similar crystal structure to that of the two-dimensional polymeric $C_{60}$, that is, adjacent $C_{60}$ molecules are connected by covalent bonds, showing a regular topological structure of repeated arrangement, without metal intercalated.

Figure 4:
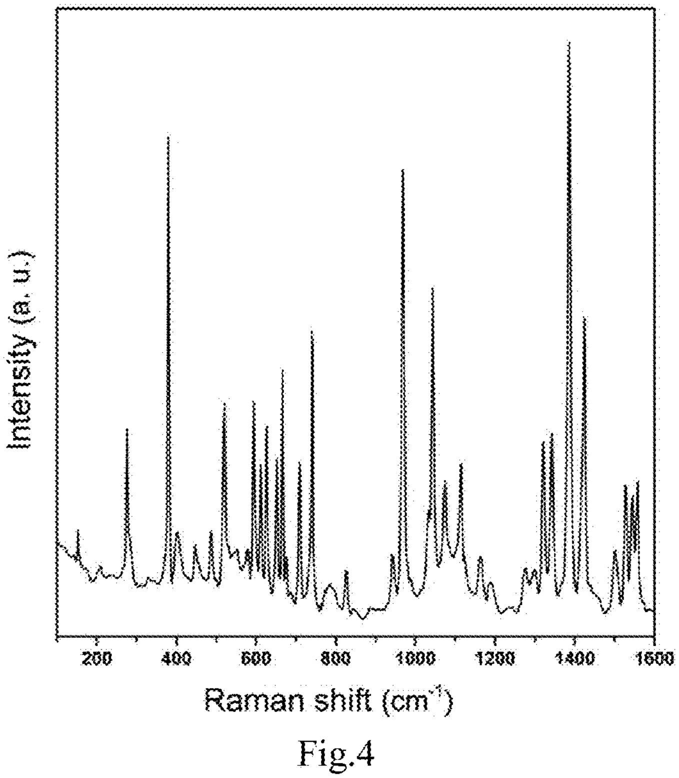
FIG. 4 is a Raman spectrum of the bulk magnesium intercalated polymeric fullerene prepared in Embodiment 1 of the present application.
Figure 5:
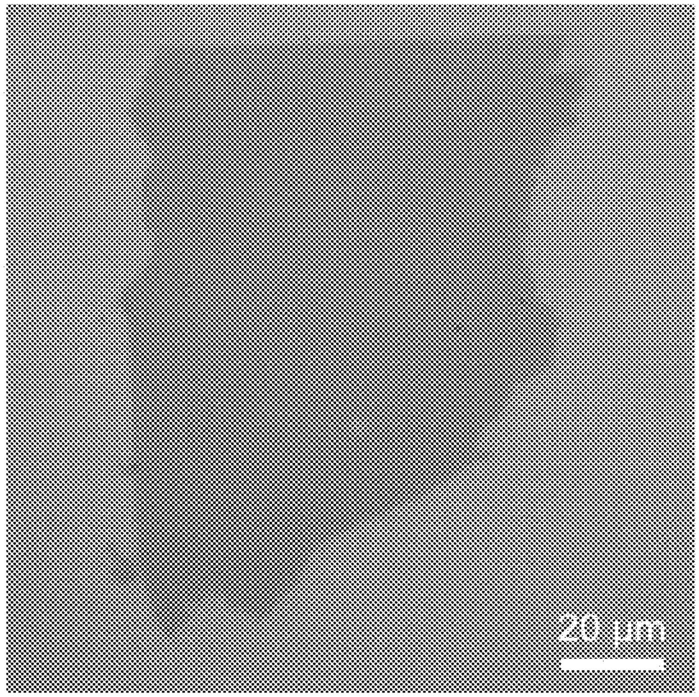
FIG. 5 is an optical microscope image of the two-dimensional polymeric fullerene prepared in Embodiment 1 of the present application.
Figure 6:
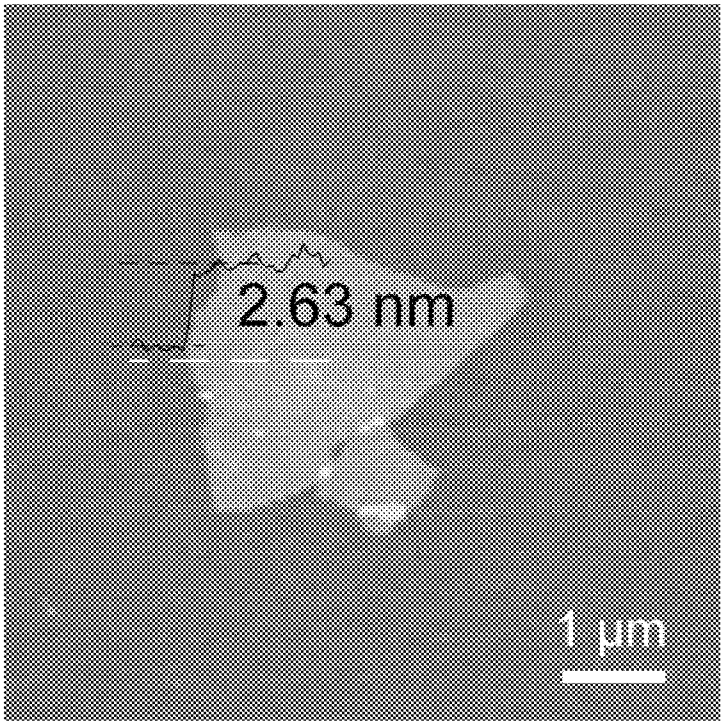
FIG. 6 is an atomic force microscope image of the two-dimensional polymeric fullerene prepared in Embodiment 1 of the present application.
Figure 9:
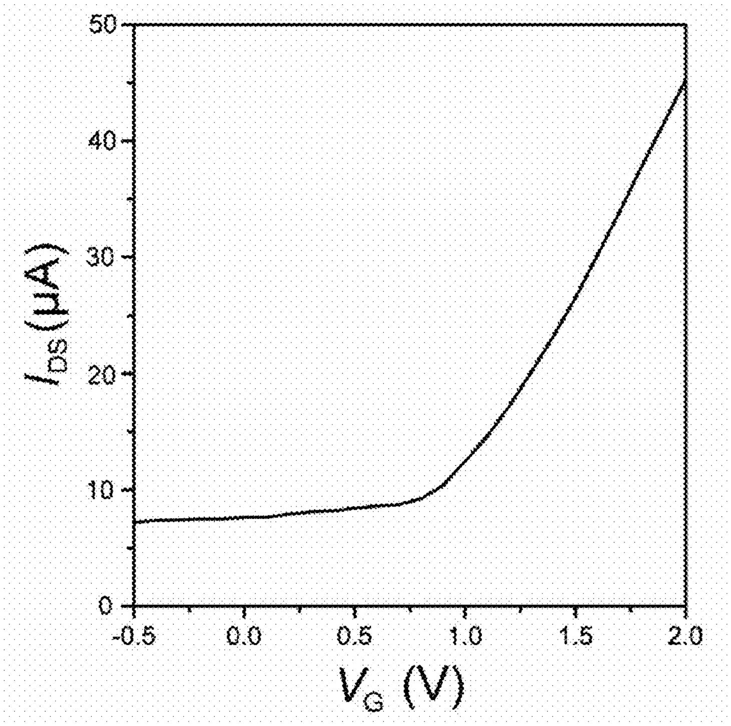
FIG. 9 is a transfer characteristic curve of the transistor of two-dimensional polymeric fullerene prepared in Embodiment 1 of the present application.
Figure 10:
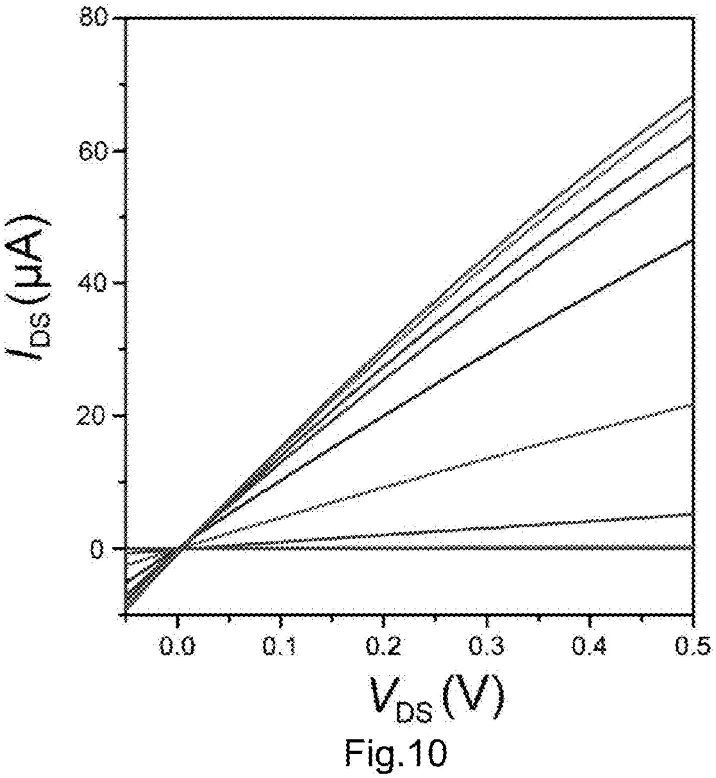
FIG. 10 is an output characteristic curve of the transistor of two-dimensional polymeric fullerene prepared in Embodiment 1 of the present application.

Perform relevant tests on the magnesium intercalated polymeric $C_{60}$ blocks and the two-dimensional polymeric $C_{60}$ prepared in the embodiments, and the specific results are shown in FIGS. 1 to 16. Wherein, FIG. 1 is a scanning electron microscope image of the polymeric $C_{60}$ block prepared in step S1 of Embodiment 1, from which it can be seen that the block has high crystallinity and a lateral size of greater than 200 μm; FIGS. 2 and 3 are schematic diagrams of a single crystal structure and a interlayer structure of the polymeric $C_{60}$ block prepared in step S1 of Embodiment 1. FIGS. 2 and 3 are obtained from single crystal XRD data; FIG. 4 shows the Raman spectrum of the polymeric $C_{60}$ block prepared in step S1 of Embodiment 1, from which it can be seen that the polymeric $C_{60}$ block has high crystallinity; FIG. 5 is an optical microscope image of the two-dimensional polymeric $C_{60}$ prepared in Embodiment 1, where it can be seen that the lateral size of the crystal is over 30 μm; FIG. 6 is the atomic force microscope image of the two-dimensional polymeric $C_{60}$ prepared in Embodiment 1, from which it can be seen that the thickness of the two-dimensional polymeric Cho is 2.63 nm, indicating that it is a thin layer structure less than 5 nm; FIG. 7 is the scanning transmission electron microscope picture of the two-dimensional polymeric $C_{60}$ prepared in Embodiment 1, and it can be seen that the two-dimensional polymeric $C_{60}$ is a monoclinic crystal with a quasi-tetragonal lattice structure; FIG. 9 shows the transfer characteristic curve of two-dimensional polymeric $C_{60}$ prepared in Embodiment 1; FIG. 10 shows the output curve of the two-dimensional polymeric $C_{60}$ prepared in Embodiment 1, from which it can be seen that the sample has field-effect transistor performance.

The above are only preferred specific embodiments of the present application, but the scope of protection of the present application is not limited to this. Any change or replacement that can easily be thought of by any person familiar with the technical field within the scope of the disclosed technology of the present application should be included in the scope of protection of the present application.

What is claimed is:

1. A two-dimensional polymeric fullerene, in which adjacent fullerene molecules are connected with each other through covalent bonds, showing a regular topological structure of repeated arrangement;

wherein, each fullerene cluster is connected with four fullerene clusters, and is connected with two of the fullerene clusters through one C—C single bond respectively, while is connected with the other two of the fullerene clusters through two C—C single bonds respectively, and the four carbon atoms in the two C—C single bonds form a quaternary ring structure.

2. The two-dimensional polymeric fullerene according to claim 1, wherein the two-dimensional polymeric fullerene has a thin layer structure with a thickness less than 100 nm.

3. The two-dimensional polymeric fullerene according to claim 2, wherein the two-dimensional polymeric fullerene has a thickness of 0.5-3 nm.

4. The two-dimensional polymeric fullerene according to claim 1, wherein the two-dimensional polymeric fullerene has stable chemical properties and does not decompose under ambient pressure.

5. The two-dimensional polymeric fullerene according to claim 1, wherein the two-dimensional polymeric fullerene is two-dimensional polymeric $C_{60}$.

6. A preparation method for two-dimensional polymeric fullerene, comprising the following steps:

providing metal intercalated polymeric fullerene; and replacing metal ions in the metal intercalated polymeric fullerene with quaternary ammonium salts;

wherein in the two-dimensional polymeric fullerene, adjacent fullerene molecules are connected with each other through covalent bond, showing a regular topological structure of repeated arrangement.

7. The preparation method according to claim 6, wherein in the metal intercalated polymeric fullerene, the metal is one of magnesium, lithium, potassium, and sodium.

8. The preparation method according to claim 7, wherein the structural formula of the quaternary ammonium salts is as follows:

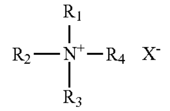

wherein $R_1$, $R_2$, $R_3$ and $R_4$ are independently selected from alkyl groups containing 1-8 carbon atoms, with $X^-$ being one of salicylate ions, fluoride ions, bromine ions, 8-hydroxyquinoline anions and other anions with coordination ability with metal ions, and the metal ions are one of magnesium ions, lithium ions, potassium ions, and sodium ions.

9. A polymeric fullerene crystal, in which adjacent fullerene molecules are connected by covalent bonds, showing a regular topological structure of a repeating arrangement of carbon clusters, without metal intercalated, wherein, each fullerene cluster is connected with four fullerene clusters, and is connected with two of the fullerene clusters through one C—C single bond respectively, while is connected with the other two of the fullerene clusters through two C—C single bonds respectively, and the four carbon atoms in the two C—C single bonds form a quaternary ring structure.

10. The polymeric fullerene crystal according to claim 9, wherein the polymeric fullerene has stable chemical properties and does not decompose under ambient pressure.

11. An electronic device comprising a two-dimensional polymeric fullerene;

wherein in the two-dimensional polymeric fullerene, adjacent fullerene molecules are connected with each other through covalent bond, showing a regular topological structure of repeated arrangement, and wherein, each fullerene cluster is connected with four fullerene clusters, and is connected with two of the fullerene clusters through one C—C single bond respectively, while is connected with the other two of the fullerene clusters through two C—C single bonds respectively, and the four carbon atoms in the two C—C single bonds form a quaternary ring structure.

* * * * *